No. 800,490. PATENTED SEPT. 26, 1905.
C. H. RICKABAUGH & W. H. CONGER.
GATE.
APPLICATION FILED JUNE 30, 1905.
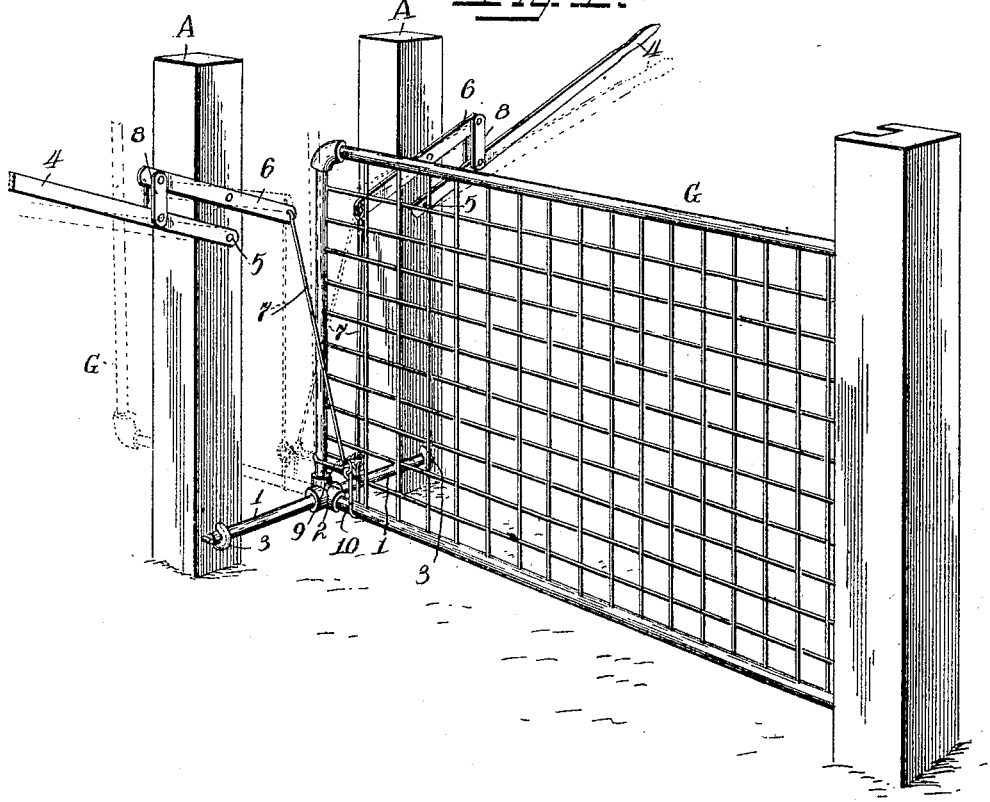
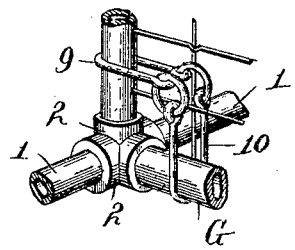

UNITED STATES PATENT OFFICE.

CLINTON H. RICKABAUGH AND WILLIAM H. CONGER, OF WASHINGTON, IOWA.

GATE.

No. 800,490. Specification of Letters Patent. Patented Sept. 26, 1905.

Application filed June 30, 1905. Serial No. 267,798.

*To all whom it may concern:*

Be it known that we, CLINTON H. RICKABAUGH and WILLIAM H. CONGER, citizens of the United States, residing at Washington, in the county of Washington and State of Iowa, have invented certain new and useful Improvements in Gates, of which the following is a specification.

Our invention relates to an improvement in gates; and the object is to provide a simple form of gate which may be operated without the necessity of dismounting by manipulating suitable levers, either of which may be used to open or close the gate.

With these objects in view our invention consists in certain novel features of construction and combinations of parts, which will be hereinafter described, and pointed out in the claims.

In the accompanying drawings, Figure 1 is a view in perspective, and Fig. 2 is an enlarged detail.

A A represent two posts, and G is the gate, the same being constructed in any approved manner, the frame preferably of gas-pipe sections and couplings with woven wire extending across from side to side and end to end. The gate is hinged, preferably, through the medium of a gas pipe or bar 1, which is attached by a four-way coupling 2 to a corner of the gate, and the hinge thus formed is mounted in and adapted to turn in staples, eyelets, or other bearings 3 3, secured to the lower ends of the posts A A.

The numerals 4 4 indicate hand-levers pivoted at 5 5 to the posts A A and extending out in opposite directions at right angles to the gate in position to be manipulated by the pedestrian or driver desiring to pass through the gate or open it for the passage of animals. Secondary levers 6 6 are pivoted to the posts a short distance above the hand-levers, their outer ends being loosely connected to the hand-levers by means of links 7 7 and their inner ends to the gate by connecting-rods 8 8.

Various connecting means might be employed; but we have shown the clevises 9 and 10 pivotally connected together, clevis 9 being disposed horizontally and embracing the rear edge of the gate and clevis 10 vertically or approximately so and embracing the lower edge of the gate and the two pivoted to the connecting-rods at or near their points of juncture with each other. Thus it will be seen that to raise the gate the vertically-disposed clevis is brought into play by pressing down on either of the hand-levers, and the horizontally-disposed clevis 9 in its turn is brought into play to lower the gate by the act of lowering one or the other of the hand-levers. In this way a very simple and inexpensive arrangement is provided for the accomplishment of the purposes sought by the invention. This construction is such that at the proper time in the swinging of the gate a slack is produced which allows the gate to pass on beyond the perpendicular, and thus to remain open as long as the operator wishes by resting upon its end or in an upright position. The position of the clevises is such therefore that either when the gate is open or closed the connecting-rods 8 8 are in a position to give a side pull, which will produce the desired results.

In the operation of the gate it may be approached and operated from a carriage, on horseback, or on foot, and the gate may be partly opened to let small animals through or fully opened or closed, as the case may be.

It is evident that slight changes might be resorted to in the form and arrangement of the several parts described without departing from the spirit and scope of our invention, and hence we do not wish to limit ourselves to the exact construction herein set forth; but, Having fully described our invention, what we claim as new, and desire to secure by Letters Patent, is—

1. The combination with suitable posts, and a gate hinged to swing vertically, of levers and means extending from the levers to the bottom and rear edge of the gate and loosely engaging the gate at said points, whereby the gate is either raised or lowered by depressing one of the levers.

2. The combination with a gate hinged at one of its corners, of hand-levers, connecting-rods, and clevises pivotally connected together and with the connecting-rods, said clevises extending at an angle to each other with one embracing the lower and the other the rear edge of the gate.

3. The combination with suitable posts, levers pivoted thereon, and a gate, of a hinge comprising staples, eyelets or other bearings, and a gas-pipe or equivalent, and a coupling for connecting said gas-pipe to one corner of the gate.

4. The combination with suitable posts, and a gate hinged thereto, of a pair of clevises loosely embracing the rear and lower rods or tubes of the gate and loosely connected together, levers pivoted to the post, and rods extending from the inner ends of the levers to the inner and connected ends of the clevises.

5. The combination with suitable posts, and levers pivoted thereto and projecting inwardly toward each other, of a pipe or bar 1, hinged to the lower ends of the posts, a gate secured to the pipe or bar, clevises embracing the rear and lower edge of the gate at short distances from the pipe or bar, and links extending from the inner ends of the clevises to the levers.

In testimony whereof we have affixed our signatures in presence of two witnesses.

CLINTON H. RICKABAUGH.
WILLIAM H. CONGER.

Witnesses:
A. S. FOLGER,
W. R. JEFFREY.